Oct. 26, 1937.     S. F. COLE     2,097,388
METHOD AND MEANS FOR MEASURING THE VISCOSITY OF FLUIDS
Filed Aug. 27, 1932     2 Sheets-Sheet 1
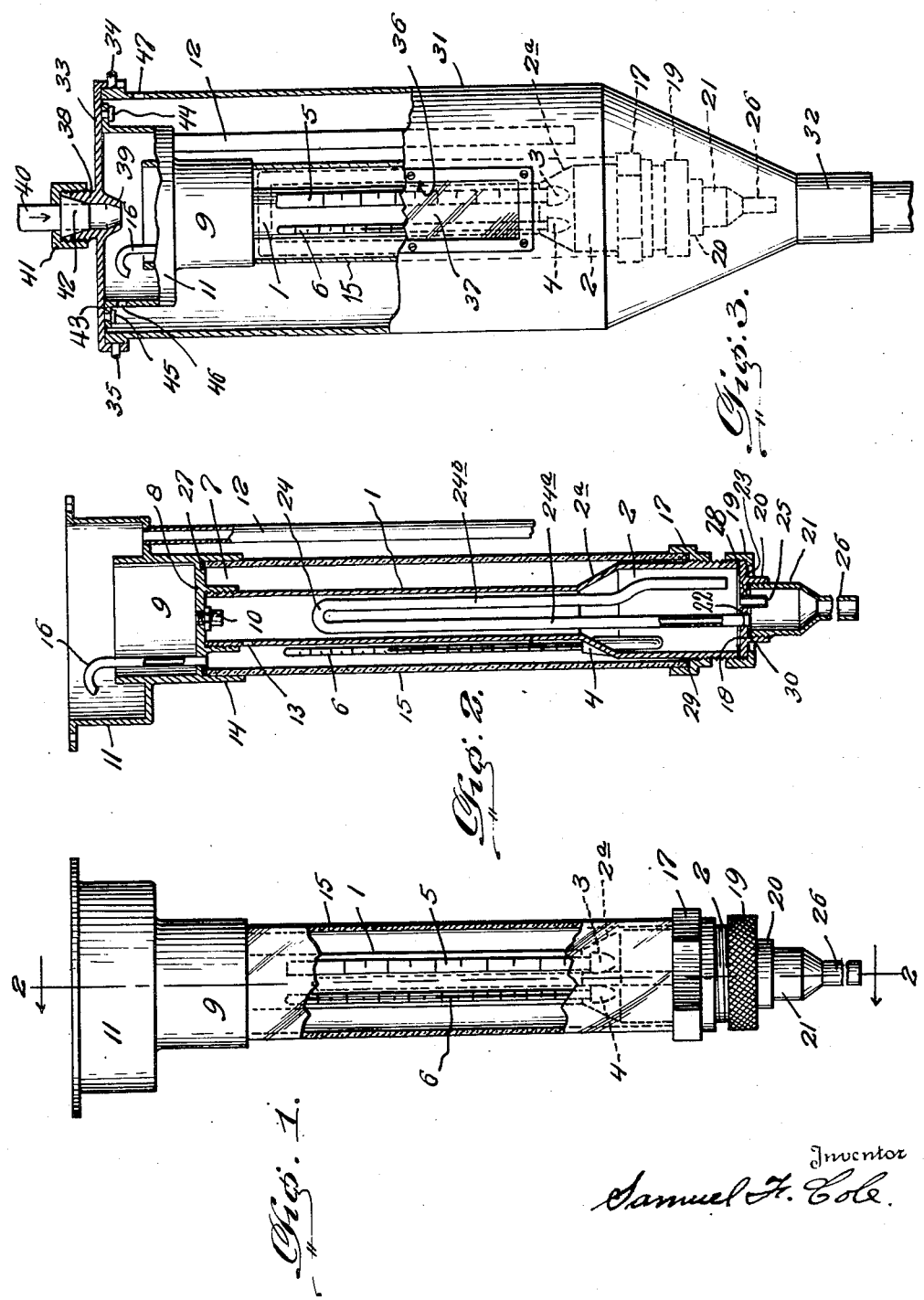
Inventor
Samuel F. Cole.

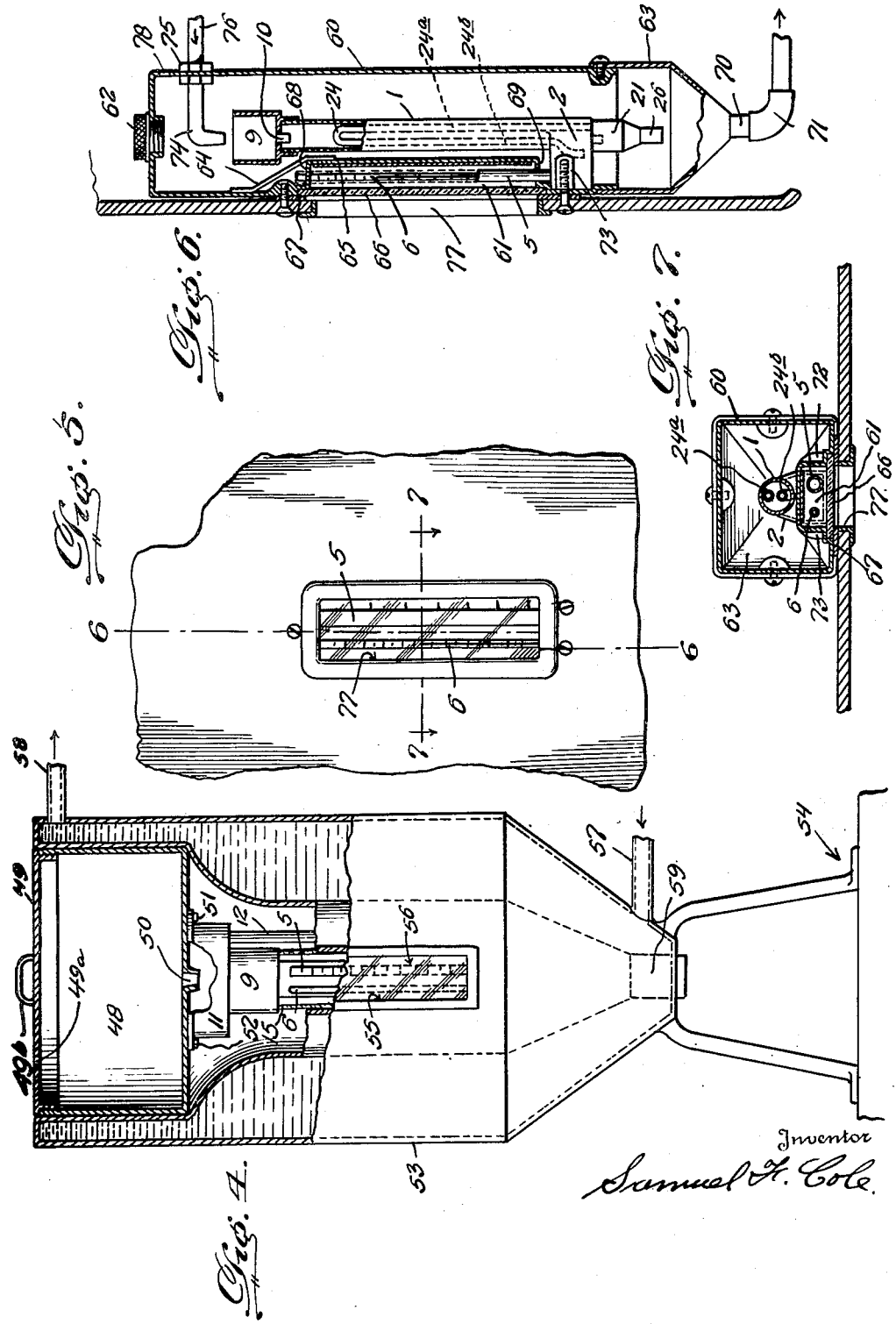

Patented Oct. 26, 1937

2,097,388

UNITED STATES PATENT OFFICE 2,097,388

METHOD AND MEANS FOR MEASURING THE VISCOSITY OF FLUIDS

Samuel F. Cole, Washington, D. C.

Application August 27, 1932, Serial No. 630,736

19 Claims. (Cl. 265—11)

This invention relates to methods and means for determining and indicating the internal friction or viscosity of fluids, and more especially to those methods and devices which are adapted to the measurement of the viscosity of fluids by the measurement of their rate of flow.

Viscometers may be classified under several types, most of which require, for their successful operation, either the precise functioning of accessory apparatus, or the possession, by the operator, of accurate manipulative skill.

The term "accessory apparatus" is meant to include the various independent means employed for maintaining either a predetermined pressure, or a predetermined velocity, of a fluid under test, or the means employed for the maintenance of constant speeds of rotatable members in contact with a fluid under test. When such accessory means are employed, the accuracy of the resulting viscosity determinations is dependent upon the maintenance of a degree of accuracy by the accessory apparatus which, when such means are practicable, is achieved by comparatively complicated and expensive apparatus.

Efflux viscometers, which are relatively simple in design and which comprise the type of viscometer generally regarded as standard, require the use of accurate means for indicating time and carefully graduated measuring vessels. The use of stop-watches and measuring vessels introduces the human factor, in viscosity determinations, to an extent where the accuracy of the determinations is dependent upon the degree of coordination between the human element and the mechanical means. Even under the most favorable conditions, this method gives variable results.

The principal objects of my invention are:

To provide a new and simple method for the determination and indication of viscosity.

To provide a new and improved method for measuring viscosity which is adapted either for continuous operation, in connection with fluid circulating systems, or for individual determinations.

To provide a new method for measuring viscosity which will eliminate the use of accessory apparatus, and provide for an efficient means—devoid of moving parts—for effecting the contemplated results.

To provide a universal viscometer adapted for the rapid, accurate, and economical measurement of viscosity under the varied conditions, and to meet the complex requirements, of scientific and industrial use.

To provide a self-contained viscometer—devoid of the inherent disadvantages of accessory mechanisms, and requiring no movable parts for its operation.

To provide a viscometer giving direct indications, and adaptable, either for continuous operation in connection with a fluid circulating system, such as the lubricating system of engines, machines, and the like, and with containers for fluids in process of manufacture, when such containers are adapted to provide a circulation of a fluid through the instrument, or for individual determinations by portable instruments.

To provide a viscometer operable at atmospheric pressure, responsive to the hydrostatic pressure of the fluid within the instrument, and adaptable for operation at arbitrary pressures.

To provide a viscometer of extreme simplicity, susceptible of inexpensive construction—of either metal or glass—which shall be easy to calibrate in any desired units of viscosity, and which will be as efficient in use by the layman, as by the technologist.

With these and other objects in view, my invention, in its general aspects, consists of the method and means for supplying a fluid under test, at a constant head, to a chamber from which it flows under the influence of gravity, the flow of the said fluid from the chamber being utilized to vary the volume of the fluid within the said chamber to an extent which bears a definite relation to the viscosity of the fluid, and indicating the volume, or level, of the fluid, contained within the said chamber, in units of viscosity. My method and means for utilizing the flow of a fluid to vary the volume, or level, of said fluid, contained within the chamber, provides for causing the flow of a fluid from said chamber to operate a suction inducing means proportionally to its rate of flow, and for adapting the suction inducing means to vary the volume of the fluid, within the chamber, in response to variations in the flow of the fluid therefrom.

More specifically, my invention consists of the method and means for measuring viscosity whereby a fluid under test is discharged from a container, adapted to maintain a uniform fluid level, into a chamber wherefrom it is discharged, through a pressure reducing means, at a rate bearing a definite relation to its viscosity, and of providing a secondary discharge means, hereinafter termed a "suction tube", connecting the chamber with the pressure reducing means whereby variations in pressure, responsive to the rate of flow of the fluid through the pressure reducing means, induces, or accelerates, a secondary discharge from the chamber, and of means associated with the chamber to indicate the variations in the volume, or level, of its contents in units of viscosity.

Obviously, it is impracticable to show, or describe, all of the numerous applications and modifications of my invention. However, the accompanying drawings and the following specifications, wherein a certain preferred embodiment is clearly set forth, will readily disclose the objects, advantages, and features of my invention to those skilled in the art. The following disclosures are not to be construed as limitations upon the inventive thought which forms the basis of this application, but merely illustrative of the principles involved.

In the drawings, wherein similar numerals indicate similar parts throughout the several views:

Fig. 1 is a front view, partially in section and partially in elevation, of one embodiment of my invention.

Fig. 2 is a vertical sectional view of Fig. 1 on line 2—2.

Fig. 3 is a front view partially in elevation and partially in section of the same embodiment of my invention adapted for connection to a fluid circulating system.

Fig. 4 is a front view partially in elevation and partially in section of the same embodiment of my invention adapted for use as a portable instrument for laboratory determinations.

Fig. 5 is a front view in elevation of the same embodiment of my invention adapted for connection to the circulating lubricating system of an automobile, power boat, or aeroplane.

Fig. 6 is a vertical sectional view of the instrument shown in Fig. 5 taken on line 6—6 of Fig. 5.

Fig. 7 is a sectional view of Fig. 5 on line 7—7.

Referring especially to Figs. 1 and 2:

The numeral 1 indicates a tubular chamber hereinafter also termed "variable level chamber" terminating, at its lower end, in the cylindrical chamber 2. The tubulatures 3 and 4 are integral with the top 2a of the chamber 2 and support, securely sealed therein, the measuring tube 5 and the thermometer 6 respectively. The upper end of chamber 1 is exteriorly screw-threaded to engage the interiorly screw-threaded, annular boss 7 which depends from, and is integral with, the bottom 8 of the constant level chamber 9. Centrally disposed in the bottom 8 of the constant level chamber 9, is a feed nozzle 10 concentric with the annular boss 7 and adapted to discharge into chamber 1. An overflow chamber 11 is attached to, and concentric with, the constant level chamber 9 and is provided with the overflow tube 12. The upper end of chamber 1 is provided with a vent 13 which permits the escape of air from chamber 1 upon the ingress of a fluid from the constant level chamber 9. The constant level chamber 9 is formed with the depending, tubular extension 14 which provides a seat for the upper end of the glass jacket 15. A vent tube 16 is attached within an annular orifice in the bottom 8 of the constant level chamber 9 and extends through, and above, chamber 9 where it terminates in a bend adapted to prevent the ingress of fluids. The vent 16 permits the escape of the air expelled through vent 13 and from the open upper end of the glass measuring tube 5. Chamber 2 is provided with the annular flanged member 17 which is interiorly screw-threaded to engage the exteriorly screw-threaded lower end of chamber 2 whereon it is adjustable to support the glass cylindrical jacket 15. Chamber 2 is also provided with the detachable bottom 18 which is firmly clamped in place by the interiorly screw-threaded, annular member 19. A depending annular boss 20 is integral with the bottom 18 and is interiorly screw-threaded to engage the exteriorly screw-threaded upper end of the cylindrical suction, or pressure reduction, chamber 21. Positioned within the periphery of the annular boss 20, are two annular orifices—22 and 23. The leg 24a, of the substantially U shaped suction tube 24, extends below the leg 24b and is firmly attached within the orifice 22 in the bottom 18 while the leg 24b, which is suitably curved to avoid interference with the efflux nozzle 25, communicates with chamber 2. It is evident that suction tube 24 is rigidly supported within chambers 1 and 2 by the bottom 18 and the annular member 19. An efflux nozzle 25 is inserted in the orifice 23 in the bottom 18 and is adapted to discharge into the suction chamber 21. The suction chamber 21 is formed with the elongated discharge tube 26. Suitable washers, or gaskets, 27, 28, 29, and 30 are provided for the upper and lower ends of the glass jacket 15, for the bottom 18 of chamber 2, and for the suction chamber 21 respectively.

The operation of the above described device is as follows:

A fluid under test is discharged from any suitable container, or fluid circulating system, into the constant level chamber 9 at a rate somewhat in excess of the discharge capacity of the feed nozzle 10. The excess fluid overflows the constant level chamber 9 into the overflow chamber 11 from which it is discharged by the overflow tube 12. This provides a constant head of fluid in chamber 9 adapted to maintain an output into chamber 1 which varies only with the viscosity of the fluid.

The fluid discharged from the constant level chamber 9, through the feed nozzle 10, attains its maximum height in chamber 1 immediately preceding the functioning of suction tube 24 and the pressure reducing means described below. This height would only be maintained, however, until the pressure of the fluid in chamber 1 has established a flow through the suction tube 24.

The fluid discharged by the efflux nozzle 25, and the suction tube 24, enters the suction chamber 21 from which it is conveyed by the discharge tube 26. The flow of the fluid through the suction chamber 21 and the discharge tube 26 results in the reduction of the pressure within the suction chamber 21 and the suction tube 24 due to the partial expulsion of the air therefrom.

Upon a reduction in the pressure within the suction chamber 21, the combined hydrostatic pressure of the fluid in chamber 1, and the atmospheric pressure upon the fluid surface, tends to restore a uniform pressure throughout the device. This produces an increase in the rate of the discharge from the efflux nozzle 25 and the suction tube 24. The increased discharge of a fluid from chamber 1, through the efflux nozzle 25 and the suction tube 24, disturbs the balance between the supply from the feed nozzle 10 and a normal discharge from the efflux nozzle 25 resulting in a reduction in the level, or volume, of the fluid in chamber 1.

The reduction in the level of a fluid in chamber 1 continues until the rate of discharge from chamber 1 is reduced to the rate of input thereto. This equalization of rates of flow is accompanied by the establishment of a new fluid level in chamber 1, and the measuring tube 5, which is indicative of the viscosity of the fluid under test.

Other conditions being equal, the rate of discharge of a fluid from an outlet bears a definite relation to the viscosity of the fluid. Since the rate, and degree, of pressure reduction within the suction chamber 21 is responsive to, and in definite relation with, the rate of flow of a fluid through the suction chamber 21 and the discharge tube 26, and since the induced flow of a fluid through the suction tube 24 and the efflux nozzle 25 is also responsive to, and in definite relation with, the flow of a fluid through the suction chamber 21 and the discharge tube 26, it will be evident that a decrease in the viscosity of a fluid results in an increased rate of discharge accompanied by a lower level of a fluid in the measuring tube 5, and that an increase in the viscosity of a fluid results in a decreased rate of discharge accompanied by a higher level of a fluid in the measuring tube 5.

The construction of the pressure reducing means illustrated in the several views is based upon the dynamic pump wherein the flow of a liquid through a tube induces a vacuum in a communicating chamber by the expulsion of the contained air. However, any suitable means, which may vary with the nature of the fluid to be tested, may be employed to effect the reduction in pressure to operate the device.

My invention may be designed either for the operation of the suction tube 24 solely in response to the influence of the suction chamber 21, or in response to the hydrostatic pressure of a fluid contained in chamber 1 simultaneously with the operation of the suction chamber 21. The latter method renders the device more rapid in operation and reduces the force of the suction required.

Fluids of maximum viscosity flow at minimum velocity and produce a minimum reduction in pressure in the suction chamber 21. Therefore, fluids offering the maximum resistance to flow are subjected to the minimum influence by the suction chamber 21. Fluids of minimum viscosity flow at maximum velocity and produce a maximum reduction in pressure in the suction chamber 21. Therefore, fluids offering the minimum resistance to flow are subjected to the maximum influence of the suction chamber 21. In the former case, the level of a fluid within chamber 1 is at its maximum height whereas, in the latter case, it is at its minimum height. In the case of the more viscous fluids, the forces tending to readjust the pressure within the device are proportionately less than the forces acting upon the less viscous fluids. The result is the establishment of equilibrium of pressure within the device at the maximum level in the measuring tube 5 for fluids of maximum viscosity and at proportionately lower levels for fluids of lower viscosity.

A knowledge of the temperature of fluids under test is of vital importance in viscosity determinations. In the embodiment of my invention disclosed in this application, the temperature of fluids under test is indicated by a suitable thermometer 6 which depends into chamber 2, where it is in contact with a fluid passing through the device. The glass jacket 15 protects the glass measuring tube 5 and the thermometer 6 from injury, insulates the parts of the instrument contained therein, and affords a clear view of the indicating members.

Fig. 3 illustrates a method of adapting the embodiment of my invention disclosed in Figs. 1 and 2 for connection to a fluid circulating system.

In this modification, the device in Figs. 1 and 2 is adapted for inclosure within the cylindrical jacket 31 which is formed with an interiorly screw-threaded, tubular discharge member 32. The jacket 31 is provided with the detachable top member 33 which may be attached to the jacket 31 by the pin joints 34 and 35. The jacket 31 is provided with the rectangular aperture, or port, 36 which is closed by a transparent member, or window, 37 through which the measuring tube 5 and the thermometer 6 may be observed. The top member 33 is provided with the upwardly projecting, exteriorly screw-threaded annular boss 38 and with the depending supply nozzle 39. The nozzle 39 may be a prolongation of the boss 38 and both may be integral with the top member 33. The interior of the boss 38 forms a seat for the end 42 of the supply pipe 40 which is firmly clamped in place by the packing nut 41. The supply nozzle 39 is adapted to discharge a fluid into the constant level chamber 9. The upper edge of the overflow chamber 11 is formed with the annular flange 43 which is provided with suitable apertures to engage the depending pins 44 and 45 whereby a pin joint is effected to detachably mount the viscometer to the top member 33 of the jacket 31. Suitable vents 46 and 47 are provided in the overflow chamber 11 and the jacket 31 respectively.

In use, pipe 40 may be connected to any suitable supply line communicating with a fluid container. When it is desired that fluids circulate continuously, the discharge member 32 is connected to a suitable return line, or the instrument may discharge into a receptacle from which the fluid may be pumped into the original container. When installed in a fluid circulating system wherein the fluid is supplied by gravity and discharged from the instrument into a container, or pipe line, below the level of the instrument, the operation of the instrument is automatic and continuous. However, when the fluid from the instrument is returned to the original container, pumping means must be provided either to supply the instrument, or to return the discharge from the instrument.

Fig. 4 illustrates a further embodiment of the invention disclosed in Figs. 1 and 2 and is designed for use as a portable, or laboratory, instrument for individual viscosity determinations under conditions of regulated operating temperatures.

In this form, the instrument shown in Figs. 1 and 2 is provided with the detachable reservoir 48 which is supplied with the removable top 49, provided with the vent 49a and the handle 49b, and the supply nozzle 50. The viscometer shown in Figs. 1 and 2, and modified as shown in Fig. 3, is attached to the bottom of the reservoir 48 by means of the pin joints 51 and 52. The handle 49b permits the convenient removal of the viscometer from the heating jacket 53. A double-walled heating jacket 53 is supported by the stand 54 and is adapted to contain the reservoir 48 and the attached viscometer in operating position. The inner wall of the jacket 53 is formed in close approximation of the contour of the reservoir 48 and the attached viscometer, and is in contactual relation with said devices but not attached thereto. Jacket 53 is provided with the walled rectangular aperture, or port 55 extending through both walls thereof. The aperture 55 is closed by the transparent member 56 which provides a window through which the measuring tube 5 and the thermometer 6 are clearly visible. A suitable supply connection 57 and discharge connection 58 are attached to the outer wall of jacket 53 within suitably disposed annular orifices in said outer wall. These connections provide for the circulation of a heating fluid by attachment to a suitable supply of properly heated fluid. The lower end of jacket 53 is provided with the tubular aperture 59 which extends through both walls of the jacket 53 and provides an outlet for fluids discharged by the viscometer. The operation of this device requires no further explanation, it being evident that the viscometer and the reservoir are readily removable from the heating jacket and that said jacket may be modified to adapt it for operation in connection with various heating means.

In Figs. 5 and 6 are illustrated an adaption of the device shown in Figs. 1 and 2. In this form, the device is adapted for installation upon the instrument board of an automobile, motor boat, or aeroplane and is designed for connection to the circulating lubricating system thereof in a manner which provides a circulation of the oil through the instrument.

The numeral 60 indicates a rectangular metal case, or jacket, for the viscometer which is provided with a substantially rectangular recess 61, an upper screw-cap 62, a detachable bottom member 63, and a baffle plate 64. The recess 61 is adapted to contain, and display, the measuring tube 5 and the thermometer 6 in proper relation to the calibrated member 65. Recess 61 is closed by the protective cover 66 of glass, or other suitable transparent material, which is confined in place by the frame 67. In the top 68 and the bottom 69 of the recess 61 are annular orifices adapted to support the measuring tube 5 and the thermometer 6. The baffle plate 64 is attached to the inside of the front of the jacket 60 above the measuring tube 5 and the thermometer 6 in such a manner that the measuring devices, and the interior of the recess 61, are protected against the ingress of oil from the constant level chamber 9. The screw-cap 62 permits the flushing of the instrument with cleaning fluid while the detachable bottom member 63 permits the removal of the instrument from the jacket. The bottom member 63 is provided with the exteriorly screw threaded collar 70 which adapts the instrument for connection to a discharge line 71 communicating with the crank case of an engine. Chamber 2 is provided with bosses 72 and 73 which contain suitable screw threaded orifices to permit the attachment of the viscometer to the front of the jacket 60 by means of suitable screws which may also fasten the lower end of the frame 67. This instrument is simplified by the omission of the overflow chamber 11 and the over-flow tube 12. This permits the surplus oil from the constant level chamber 9 to overflow directly into the jacket 60. A supply nozzle 74 is disposed above the constant level chamber 9 and is supported in position within an annular orifice in the back of the jacket 60 by the clamping nut 75. The outwardly protruding end of the supply nozzle 74 is adapted for connection to the oil supply line 76 which leads from the oil pump of an engine. The instrument is suitably attached to the back of an instrument board wherein a suitable opening is provided through which the measuring members of the instrument are visible. A suitable frame 77 may be provided on the front of the instrument board and a vent 78 is provided in the jacket 60.

The operation of this instrument is analogous with the operation of the hereinbefore described modifications. The oil from the crank case of an engine is conveyed to the constant level chamber 9 in an amount in excess of the discharge capacity of the feed nozzle 10. The excess oil overflows the chamber 9 and is discharged through the discharge line 71, with the oil discharged from the discharge tube 26, into the crank case of the engine. A suitable strainer, not shown, may be provided between the supply nozzle 74 and the constant level chamber 9. The scale 65 may be calibrated in any desired manner to effect the efficient use of the device.

The construction of the modifications of my invention herein disclosed permit the devices to be readily dismantled for adjustments, cleaning, or repairs, and to be quickly assembled.

By varying the discharge members in the variable level chamber 1, the devices herein described may be adapted for a wide range of viscosity measurements. Any of the modifications shown may be employed for use with fluids of substantially different viscosities by using interchangeable discharge units, said units consisting of the removable bottom 18 with the suction tube 24 and the efflux nozzle 25 attached thereto. When used in this manner, the measuring tube 5 should not be calibrated directly, but should be provided with independent scales similar to scale 65 shown in Figs. 5 and 6, which may be individually calibrated in any desired units, and for varying ranges, of viscosity within the capacity of the instrument. It is therefore apparent that a single instrument may be adapted for the determination of a wide range of viscosities.

For use with corrosive fluids, or to produce a miniature instrument for pocket use, the device may, with appropriate modifications, be constructed of glass. With a device of this character, it would be desirable to have an individual instrument for each type of fluid or for each viscosity range.

It will be seen from the foregoing description and disclosures that I have provided a device well adapted to accomplish the objects hereinbefore set forth. Numerous modifications and adaptions of the structures disclosed, and numerous applications of the principles involved, are possible without departing from the spirit of my invention and I claim all such modifications and applications which fall within the scope of the appended claims.

Having thus disclosed my invention, what I claim is:

1. A viscometer comprising in combination means for discharging a fluid in which the resistance to flow is dependent upon the viscosity of the fluid, means responsive to the velocity of the discharged fluid adapted to vary the discharge at a rate inversely proportional to the viscosity of said fluid, and means to indicate the discharge rate in units of viscosity.

2. A viscometer comprising in combination a fluid container, means for discharging the fluid from said container, means responsive to the movement of the discharged fluid adapted to modify the operation of the discharging means to regulate the volume of the fluid within said container proportionally to its viscosity, and means to indicate the resultant volume of fluid within said container in units of viscosity.

3. A viscometer comprising in combination a container for a fluid, means operatively associated with said container for discharging said fluid therefrom, means responsive to the flow of the fluid from the discharging means adapted to vary the volume of the fluid within the container proportionally to the viscosity of the fluid, means to indicate the level of the fluid within the container in units of viscosity, and constant head means for supplying the container with the fluid.

4. A viscometer comprising in combination a fluid container adapted to discharge a fluid at a constant head, a receptacle adapted to receive the fluid discharged from the container and to discharge said fluid at a variable head, means in cooperative relation with the receptacle, and responsive to the discharge of the fluid therefrom, adapted to induce the discharge of the fluid from the receptacle at a rate in substantially inverse proportion to the viscosity of the fluid, and means to indicate the resultant volume of the fluid within the receptacle in units of viscosity.

5. A viscometer comprising in combination a container for fluids under test, a receptacle communicating with said container and having discharge means, means integral with said receptacle adapted to maintain a constant fluid level therein, a variable level chamber adapted to receive the fluid from the receptacle, a suction chamber, multiple discharge members operatively associated with the variable level chamber, said discharge members being responsive to the combined pressure of a fluid contained within the variable level chamber and to a reduced atmospheric pressure induced within the suction chamber, said suction chamber being responsive to the flow of the fluid discharged from the discharge members and adapting the discharge members to coact to modify the level of a fluid within the variable level chamber substantially proportionately to the viscosity of the fluid, temperature indicating means associated with the variable level chamber, and a fluid column connected with said variable level chamber and calibrated in units of viscosity.

6. A viscometer comprising in combination a supply connection to the circulating lubricating system of an engine, machine, or the like, a constant level chamber communicating with the supply connection, a variable level chamber communicating with the constant level chamber, discharge members communicating with the variable level chamber, suction inducing means adapted to control the discharge members responsive to the discharge of an oil from the variable level chamber and adapted to vary the oil level within the variable level chamber in accordance with the viscosity of the oil, a transparent indicating tube, a calibrated member in cooperative relation with the indicating tube and adapted to indicate the oil level within the variable level chamber in units of viscosity, a thermometer mounted parallel to the indicating tube for measuring the temperature of the oil under test, a container for the device adapted for mounting upon an instrument board and provided with means for viewing the thermometer and the indicating tube, and discharge connections to the crank case, or other container for the lubricating oil, of the engine, machine, or the like.

7. A viscometer comprising in combination means for promoting the flow of a fluid in which the resistance to flow is dependent upon the viscosity of the fluid, means adapted to utilize said flow to induce an increase in the rate thereof, and means for indicating the resultant flow in units of viscosity.

8. A viscometer comprising in combination multiple discharge means for discharging a fluid successively, flow inducing means responsive to the successive discharges of said fluid adapted to accelerate the discharge rate in accordance with the viscosity of the fluid, and means to indicate the resultant discharge rate in units of viscosity.

9. A viscometer comprising in combination means for maintaining a fluid column, means for maintaining a restricted discharge of the fluid therefrom, suction generating means automatically responsive to the flow of the discharged fluid, and adapted to control the level of the fluid column in accordance with the viscosity of the fluid, and means for indicating the resultant level of the fluid column in units of viscosity.

10. A viscometer comprising in combination a receptacle for the fluid under test, means for discharging the fluid from said receptacle, flow inducing means automatically responsive to the velocity of the discharged fluid adapted to vary the fluid level within the receptacle in accordance with the viscosity of the fluid, means for continuously supplying the fluid to the receptacle under a constant head, and means for indicating the variable level of the fluid in units of viscosity.

11. A viscometer comprising in combination a fluid container, discharge means in said container, suction generating means operatively associated with said container and responsive to the discharge of the fluid therefrom, discharge means automatically responsive to pressure variations induced by the suction generating means adapted to vary the fluid level in the container proportionally to the viscosity of the fluid, means to indicate said fluid level in units of viscosity, means adapted to supply said container with fluid under a constant head, and means to indicate the temperature of the fluid within the container.

12. A viscometer comprising in combination a constant level supply chamber for fluids under test, a variable head chamber, a feed nozzle in the supply chamber adapted for discharge into the variable head chamber, a pressure reducing means in cooperative relation with the variable head chamber, multiple discharge members in the variable head chamber adapted to coact with the pressure reducing means to vary the level of the fluid within the variable head chamber, the pressure reducing means being responsive to the flow of the fluid from the multiple discharge members, said discharge members being detachablely mounted to permit the substitution of discharging members of different capacity, a thermometer communicating with the variable head chamber, and a member calibrated in units of viscosity for indicating the level of the fluid in the variable head chamber.

13. A viscometer comprising in combination supply connections for continuously conveying a fluid in the process of manufacture from a tank or other container, an upper and a lower chamber, said upper chamber being supplied by said supply connections and adapted to discharge the fluid at a constant head into the lower chamber, a suction inducing means in cooperative relation with the lower chamber, multiple discharge members in cooperative relation with the lower chamber and the suction inducing means, said suction inducing means and discharge members being adapted to coact to maintain a fluid level within the lower chamber substantially proportionate to the viscosity of the fluid, means to detachably mount the discharge members, a thermometer communicating with the lower chamber, a measuring tube communicating with the lower chamber and adapted to indicate the fluid level therein in units of viscosity, a protective jacket for the device, observation means in said jacket, and discharge connections to a means for returning the fluid to its original container.

14. A viscometer comprising in combination a fluid supply, a constant level chamber communicating with the fluid supply, a variable level chamber communicating with the constant level chamber, an overflow connection communicating with the constant level chamber, a feed nozzle in the constant level chamber adapted to discharge a fluid into the variable level chamber, a plurality of discharge members in the variable level chamber, a pressure reducing means adapted to function in response to the discharge of a fluid from the discharge members, said discharge members being adapted to discharge a fluid in response to the combined hydrostatic pressure of a fluid in the variable level chamber and to the pressure reduction effected by said pressure reducing means, a transparent indicating member communicating with the variable level chamber, said indicating member being calibrated in units of viscosity, a thermometer in close proximity to the indicating member and adapted to indicate the temperature of the fluid in the variable level chamber, an insulating jacket for protecting the operating members, means for detachablely mounting the discharge members to permit changing said members to vary the viscosity range of the instrument, and a support for the device.

15. A viscometer comprising in combination a container for fluids, a constant level chamber communicating with said container and provided with an overflow means, a variable level chamber communicating with the constant level chamber, a feed nozzle in the constant level chamber and adapted to discharge a fluid into the variable level chamber, multiple discharge members detachably mounted in said variable level chamber, a pressure reducing means responsive to the combined discharges of the discharge members, said discharge members being responsive, in part, to the pressure of a fluid within the variable level chamber and, in part, to the action of the pressure reducing means, a transparent measuring tube calibrated in units of viscosity and communicating with the variable level chamber whereby the level of the fluid in the variable level chamber may be indicated in units of viscosity, a thermometer mounted parallel to the measuring tube and adapted to indicate the temperature of a fluid under test, a transparent jacket insulating the variable level chamber and associated members, vents in the variable level chamber and in the transparent jacket, a heating jacket, observation means within said heating jacket, a discharge means, and a support for the device.

16. A viscometer comprising in combination a supply means for the fluid under test, a discharge member in said supply means, a receptacle communicating with the supply means and having discharge means communicating with a variable level chamber, means in the receptacle to maintain the fluid therein at a constant level, multiple discharge members in the variable level chamber, coordinating means in cooperative relation with the multiple discharge members and adapted to vary the discharge from said members to establish a fluid level in the variable level chamber which bears a definite relation to the viscosity of the fluid, and means calibrated to indicate the fluid level within the variable level chamber in units of viscosity.

17. The method of measuring the viscosity of fluids which comprises predetermining the rates of flow of fluids within the desired viscosity range, promoting the flow of the fluid under test, adapting said flow to maintain a fluid column, establishing predetermined fluid levels in connection with said fluid column which are indicative of the predetermined rates of flow, subjecting said flow to a resistance which is dependent upon the viscosity of the fluid, utilizing the resultant flow to increase the discharge rate in accordance with the viscosity of the fluid, and measuring the viscosity of the fluid by comparing the level of the fluid column with the predetermined levels.

18. The method of measuring the viscosity of fluids which comprises predetermining the rates of flow of fluids within the desired viscosity range, promoting the flow of the fluid under test, causing said flow to maintain a fluid column, establishing predetermined fluid levels in connection with the fluid column which are indicative of the predetermined rates of flow, promoting the restricted discharge of the fluid, effecting a pressure reduction in accordance with the viscosity of the fluid, adapting said pressure reduction to vary the height of the fluid column in response to variations in the viscosity of the fluid, and measuring the level of the resultant fluid column by comparing same with the predetermined levels.

19. A viscometer comprising in combination a fluid container, orifice means to permit flow of fluid from said container, suction means responsive to variations in the viscosity of the fluid flowing from said container adapted to induce corresponding variations in the volume of the fluid within said container and means for indicating the resultant fluid level within the container in the desired calibrated units.

SAMUEL F. COLE.